UNITED STATES PATENT OFFICE.

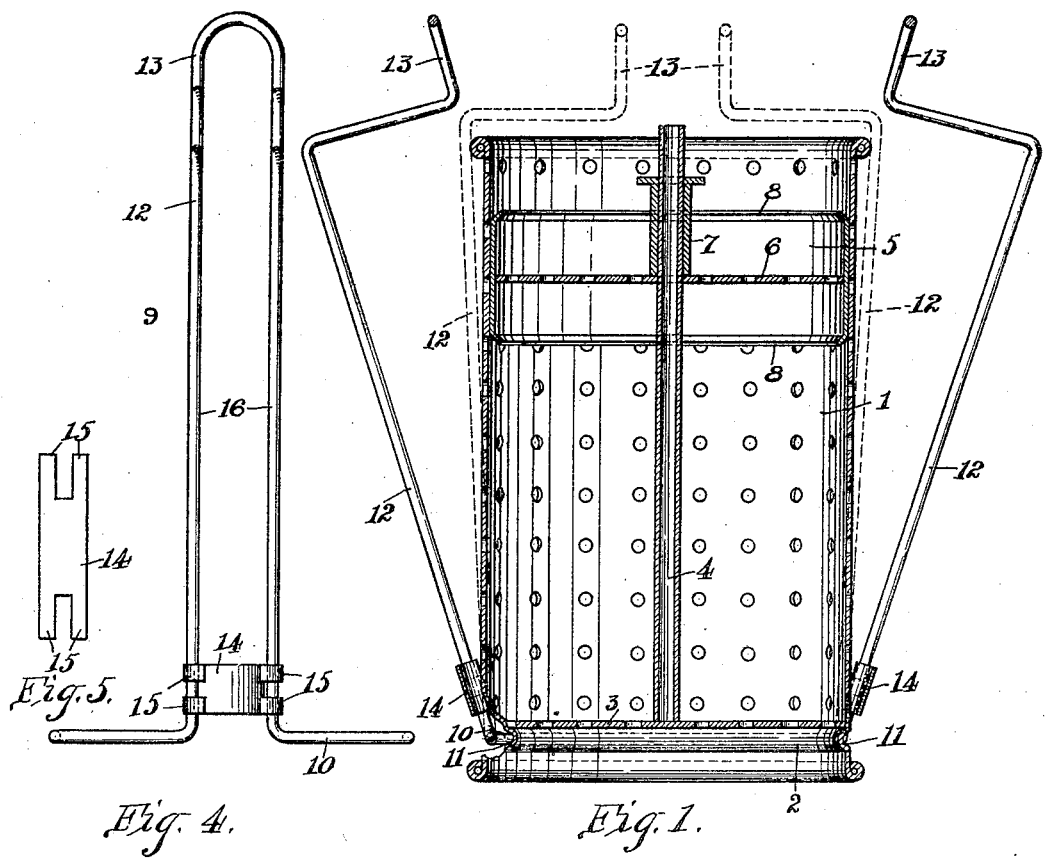
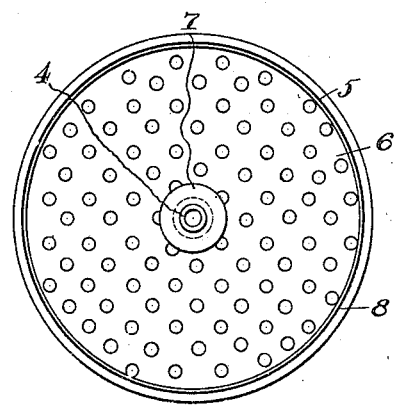
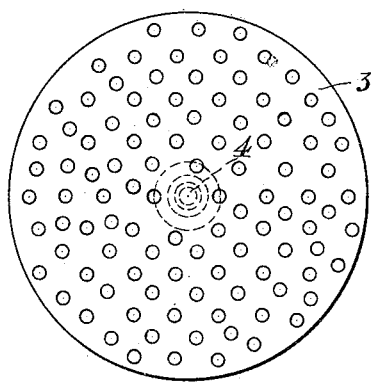

CHAUNCEY C. MOWBRAY AND WARREN F. GEIST, OF CHICAGO, ILLINOIS.

COFFEE-PERCOLATOR.

943,036. Specification of Letters Patent. Patented Dec. 14, 1909.

Application filed February 8, 1909. Serial No. 476,724.

*To all whom it may concern:*

Be it known that we, CHAUNCEY C. MOWBRAY and WARREN F. GEIST, citizens of the United States, residing at Chicago, county of Cook, and State of Illinois, have invented certain new and useful Improvements in Coffee-Percolators, of which the following is a specification.

Our invention relates to coffee percolators.
The object of our invention is to provide a device of the character mentioned which will be adapted to be supported in a coffee pot or other vessel in which coffee grounds are boiled, the same being adapted to contain the latter during the process of decoction.

A further object of our invention is to provide a device of the nature stated which may be readily supported in or removed from a containing vessel, and further a device which will be efficient and durable, though simple and inexpensive of construction.

Other objects will appear hereinafter.

Our invention consists in certain details of construction and arrangement of parts all as will be hereinafter fully described and particularly pointed out in the claims.

Our invention will be more readily understood by reference to the accompanying drawings forming a part of this specification, and in which, Figure 1 is a central longitudinal section of the preferred form of our device, Fig. 2 is a top plan view of the cover member of our device, Fig. 3 is a bottom plan view of the bottom member thereof, Fig. 4 is a side elevation of the supporting means embodied in our invention, and Fig. 5 is a plan view of a link employed in connection with said supporting means.

Referring now to the drawings 1 indicates the tubular body of our device, the same being formed preferably of foraminated sheet metal. Removably supported in said body the same preferably resting upon a circumferentially extending internal ridge 2 formed in said body close to the lower edge thereof, is a bottom forming member 3, formed preferably of foraminated sheet metal. Upwardly extending from the central portion of said bottom member, the same being fixed, preferably soldered thereto, is a preferably tubular stem 4. Slidably mounted in said member 1, hence adapting the same to be vertically adjustable therein, is a tubular member 5. Carried by said member 5, the same being positioned therein preferably midway the extremities thereof, is a foraminated sheet metal cover forming member 6.
Upwardly extending from the central portion of said cover member 6 is a sleeve 7 of an internal diameter such as to adapt the same to slidably receive the stem 4 which extends therethrough and hence through the cover member 5. In order to facilitate readily inserting the member 5 into the body 1, the edges of the former are beveled or formed inwardly disposed, as shown.

9 indicates a preferably wire formed supporting member. The lower portion 10 of the member 9 is circularly formed, said portion being adapted to engage the channel 11 formed by the internal ridge 2. Upwardly extending from said circular portion 10 are diametrically opposed angularly formed portions 12 of a length slightly greater than that of the body 1, for obvious reasons. The upper extremities 13 of said portions 12 are adapted to serve as finger pieces. In order to securely hold the circular portion 10 of the member 9 in engagement with the channel 11, we provide preferably sheet metal links 14, the end portions 15 of which are adapted to be clenched around the lower end portions of the respective parallelly extending wire portions 16 of the portions 12, as clearly shown in Fig. 4. The supporting member 9 is preferably formed of spring wire, the portions 12 thereof being so formed as to normally rest in an outward obliquely disposed position, as shown in Fig. 1. By such construction upon placing our device in a coffee pot, the portions 12 of the member 9 will forcibly rest against the inside surface thereof and hence support the device therein because of frictional contact with said inside surface. By such construction it is obvious that our device will be applicable to any coffee pot or similar vessel of a diameter within ordinary range, the same being adapted to be readily placed therein or removed therefrom.

While we have shown what we deem to be the preferable form of our device, we do not wish to be limited thereto, as there might be many changes made in the details of construction and arrangement of parts without departing from the spirit of our invention. And although we have designed our device with special reference to percolation of coffee, we may use the same in any other connection to which it is applicable.

Having described our invention what we claim as new and desire to secure by Letters Patent is:

1. In a percolator, the combination of a tubular foraminated body, an internal channel formed at the lower edge of said body, a foraminated bottom member adapted to rest upon said ridge, a stem upwardly extending from said bottom member, a removable foraminated cover vertically slidable in said body, a sleeve upwardly projecting from said cover adapted to receive said bottom stem, substantially as described.

2. In a percolator, the combination of a tubular foraminated body, a circumferentially extending internal channel formed at the lower edge of said body, a foraminated bottom member adapted to rest upon said channel, a stem upwardly extending from said bottom member, a removable foraminated cover vertically slidable in said body, a sleeve upwardly projecting from said cover adapted to receive said stem, a wire formed supporting member, the lower portion thereof being circularly formed to engage said channel, and spring arms formed integrally with and upwardly and obliquely projecting from said circular portion of said supporting member, said arms being adapted to engage the inside surface of a containing vessel, substantially as described.

In testimony whereof we have signed our names to this specification in the presence of two subscribing witnesses.

CHAUNCEY C. MOWBRAY.
WARREN F. GEIST.

Witnesses:
JOSHUA R. H. POTTS,
HELEN F. LILLIS.